United States Patent
Chevobbe et al.

(10) Patent No.: US 11,182,170 B2
(45) Date of Patent: Nov. 23, 2021

(54) MIMD PROCESSOR EMULATED ON SIMD ARCHITECTURE

(71) Applicant: COMMISSARIAT A L'ENERGIE ATOMIQUE ET AUX ENERGIES ALTERNATIVES, Paris (FR)

(72) Inventors: Stéphane Chevobbe, Bourg-la-Reine (FR); Marc Duranton, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/734,729

(22) PCT Filed: Jun. 6, 2019

(86) PCT No.: PCT/FR2019/051352
§ 371 (c)(1),
(2) Date: Dec. 3, 2020

(87) PCT Pub. No.: WO2019/234359
PCT Pub. Date: Dec. 12, 2019

(65) Prior Publication Data
US 2021/0240482 A1    Aug. 5, 2021

(30) Foreign Application Priority Data
Jun. 8, 2018 (FR) ........................... 1855012

(51) Int. Cl.
*G06F 9/30* (2018.01)
*G06F 9/38* (2018.01)
(Continued)

(52) U.S. Cl.
CPC .............. *G06F 9/3887* (2013.01); *G06F 5/06* (2013.01); *G06F 9/30101* (2013.01); *G06F 9/321* (2013.01); *G06F 15/8007* (2013.01)

(58) Field of Classification Search
None
See application file for complete search history.

(56) References Cited

U.S. PATENT DOCUMENTS 4,435,758 A * 3/1984 Lorie ..................... G06F 9/3009
712/22
4,992,933 A    2/1991 Taylor
(Continued)

OTHER PUBLICATIONS

International Search Report dated Aug. 23, 2019 in PCT/FR2019/051352 filed on Jun. 6, 2019, 2 pages.
(Continued)

*Primary Examiner* — Corey S Faherty
(74) *Attorney, Agent, or Firm* — Oblon, McClelland, Maier & Neustadt, L.L.P.

(57) ABSTRACT

A processor having a SIMD architecture, including an array of elementary processors, each elementary processor being associated with an elementary memory cell, a central controller connected to the elementary processors by an instruction bus and a status bus. The central controller transmits a sequence of instructions in a loop, each instruction including a calculation flow indicator. Each elementary processor has an instruction filter that makes it possible to reject or take into account an instruction depending on the identifier it contains. This operating mode makes it possible to emulate a MIMD processor on a SIMD architecture.

11 Claims, 4 Drawing Sheets

(51) Int. Cl.
    *G06F 9/32*    (2018.01)
    *G06F 5/06*    (2006.01)
    *G06F 15/80*   (2006.01)

(56) References Cited

U.S. PATENT DOCUMENTS

| | | | |
|---|---|---|---|
| 6,094,715 A * | 7/2000 | Wilkinson | G06F 9/30189 |
| | | | 712/20 |
| 9,229,721 B2 * | 1/2016 | Chen | G06F 9/3851 |
| 9,830,156 B2 * | 11/2017 | Krashinsky | G06F 9/3887 |

OTHER PUBLICATIONS

French Preliminary Search Report (with English translation of Categories of Cited Documents) dated Feb. 26, 2019 in French Application 1855012 filed on Jun. 8, 2018, 2 pages.

Mesman, B. et al., "Dynamic-SIMD for lens distortion compensation," Application-specific Systems, Architectures and Processors (ASAP'06), 2006, pp. 261-264, XP055561434.

Dudek, P., "SCAMP-3: A Vision Chip with SIMD Current-Mode Analogue Processor Array," Focal-Plane Sensor-Processor Chips, 2011, pp. 17-43, 28 total pages.

Yamazaki, T. et al., "A 1ms High-Speed Vision Chip with 3D-Stacked 140GOPS Column-Parallel PEs for Spatio-Temporal Image Processing," ISSCC 2017, Session 4, Imagers 4.9, pp. 82-84.

* cited by examiner

MIMD PROCESSOR EMULATED ON SIMD ARCHITECTURE

TECHNICAL FIELD

The present invention generally relates to the field of MIMD (Multiple Instruction Multiple Data) processors, in particular for carrying out image processing operations in a vision system such as a smart retina.

STATE OF PRIOR ART

Smart retinas are integrated circuits combining a matrix of sensors and a processor consisting of a matrix of processing elements (PE), with the processing elements, also known as elementary processors, carrying out processing operations on the signals provided by these sensors. Generally speaking, there is a correspondence between the sensors (or pixels) and the processing elements: a processing element is in charge of processing the signals coming from one or more pixels.

The processor can perform elementary processing in the image (e.g. spatial filtering) or even more complex operations such as point of interest (POI) search or object detection. Generally, the architecture of the processor is of the SIMD (Single Instruction Multiple Data) type, in other words the same instruction is carried out in parallel by all the processing elements, each of which processes different data because it is connected to different pixels. Each processing element has its own arithmetic and logic unit (ALU), registers and, if necessary, local memory and receives the same instruction as all the other processing elements.

An example of a vision system using a processor with SIMD architecture has been described, for example, in P. Dudek's chapter "SCAMP-3: a vision chip SIMD current-mode analogue processor array" in the book "Focal-plane sensor-processor chips", 2011, published by A. Zarandy at Springer.

This type of architecture is adapted to massively parallel computations but is not optimal when separate processing operations have to be performed on different parts of the image. The nature of the SIMD architecture actually requires that these separate processing operations be performed sequentially, which is detrimental to the execution time.

More recently, a SIMD processor architecture whose processing elements operate in parallel on respective columns of the matrix of sensors has been provided. This architecture has been described in the paper by T. Yamazaki et al. entitled "A 1 ms high-speed vision chip with 3D-stacked 1 column 140 Gops column-parallel PEs for spatial-temporal image processing" published in ISCCC 2017 Conf. Proc. Session 4, Imagers 4.9, pages 82-84. This architecture allows some flexibility in that it is possible to independently and simultaneously choose one of four processing options for different vertical regions of the image.

The purpose of the present invention is therefore to provide a processor architecture which is simple and allows distinct parallel processing operations to be carried out in a flexible manner, in particular on different zones of any configuration of an image sensed by a matrix of sensors.

DISCLOSURE OF THE INVENTION

The present invention is defined by a processor with SIMD architecture comprising a matrix of processing elements, each processing element being associated with a memory cell for storing data to be processed by said processing element, the processor further comprising a central controller, the processing elements being connected to the central controller by a first bus, called an instruction bus, enabling the central controller to transmit instructions to the processing elements in parallel, and by a second bus, called a status bus, enabling the central controller to receive statuses of the different processing elements, said processor being advantageous in that:

the central controller comprises a memory in which tasks to be performed by the various processing elements are stored in the form of a sequence of instructions, the central controller transmitting the sequence of instructions in a loop on the instruction bus, each instruction comprising a computational flow identifier, a computational flow being defined as an ordered list of tasks, each computational flow relating to one or more processing element(s);

each processing element comprises an instruction filter and an identifier table, the instruction filter being adapted to extract the computational flow identifier from each instruction received by the processing element and to determine whether the identifier is present or not in said table, the instruction being stored in a FIFO buffer to be executed by the processing element if yes and rejected by the processing element if no.

The FIFO buffer is typically unstacked at each instruction executed by said processing element.

Advantageously, each instruction in a task has an order number indicating its order of execution in the task, the instruction filter of the processing element comprising a counter that is incremented each time the FIFO buffer is unstacked, an instruction being stored in the FIFO buffer only if its flow identifier is present in the table of the processing element and if its order number is equal to the output value of said counter.

In particular, instruction transmission frequency on the instruction bus can be substantially higher than the execution frequency of these instructions by processing elements.

Each instruction advantageously comprises an instruction pointer and the processing element comprises a micro-sequencer connected to a storage memory of a microcode library, the micro-sequencer sequencing micro-instructions of the microcode pointed to by said instruction pointer.

In addition, each processing element may be connected to its neighbours by means of communication links, a communication link between a first processing element and a second processing element connecting a first transmit register of the first processing element to a second receive register of the second processing element and a second transmit register of the second processing element to a receive register of the first processing element.

Executing the micro-instructions by the first processing element is then stopped as long as the first transmit register is not empty.

Alternatively, executing the micro-instructions by the second processing element is stopped as long as the second receive register is not full.

In the first case, the first processing element that has completed execution of a task informs the central controller of it through a notification of its status and the second processing element is informed of this status by the central controller.

The present invention also relates to a smart optical sensor characterised in that it comprises a matrix of elementary sensors and a processor with SIMD architecture according to one of the preceding claims, each processing element being associated with a plurality of sensors of said matrix and being adapted to process signals from these sensors. Each processing element may itself have a SIMD architecture.

BRIEF DESCRIPTION OF THE DRAWINGS

Further characteristics and advantages of the invention will appear upon reading a preferential embodiment of the invention, described with reference to the appended figures in which.

DETAILED DISCLOSURE OF PARTICULAR EMBODIMENTS

In the following a SIMD processor as defined in the introductory part will be considered. It is reminded that such a processor consists of a matrix of processing elements (PEs) sharing a same instruction bus and for executing the same instruction in parallel during the same time interval. In a particular mode of use, this processor is integrated with a matrix of sensors (e.g. photodiodes) within a smart optical sensor (smart retina). More precisely, in this case, each processing element is associated with a sub-matrix of the matrix of sensors, the signals from the different sensors of the sub-matrix being stored in a storing sub-matrix, also called a macro-pixel. The structure of such a storing sub-matrix has been described in application FR-A-2984556. The processing elements themselves advantageously have a SIMD architecture (each processing element then comprising a plurality of computing units operating in parallel) and can therefore process several data stored in the storing sub-matrix in parallel.

The idea underlying the present invention is to emulate a processor with MIMD (Multiple Instructions Multiple Data) architecture, such as a multi-core processor, from a processor with SIMD architecture, making it possible not to multiply resources required to ensure storage and sequencing of instructions, necessary for each instance of MIMD processor.

Figure 1:
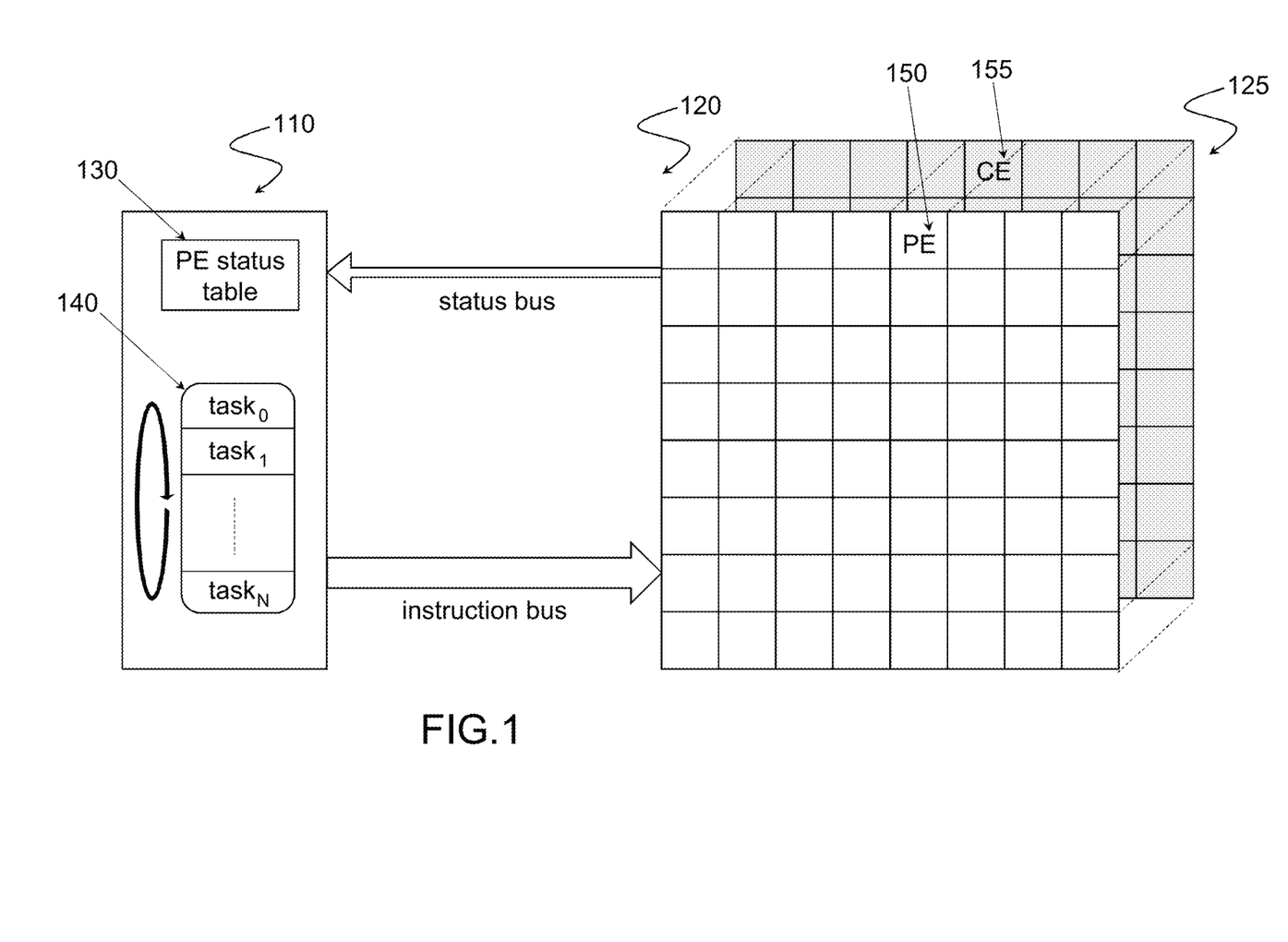
FIG. 1 schematically represents the general architecture of a SIMD processor according to one embodiment of the invention.

FIG. 1 schematically represents the architecture of a processor with SIMD architecture according to one embodiment of the invention.

This processor comprises a matrix 120 of processing elements 150 (PE), each processing element can access a memory cell associated therewith. More precisely, the memory, 125, is divided into memory cells 155 (CE) containing data to be processed by the processing element. For example, the memory cell has the above-mentioned storing sub-matrix structure and each processing element processes data of the corresponding macropixel.

The processing elements are connected in parallel to a central controller 110 by means of a first common bus, called an instruction bus. Thus, when an instruction is transmitted by the controller, each of the processing elements receives it and can execute it in parallel.

The processing elements are also connected to the central controller via a second common bus, called a status bus, on which they can transmit their respective statuses. By status, it is meant here, for example, the state of a task (in particular the end of a task), the occurrence of an error in executing a task (division by zero, overflow) or a software interruption. The statuses of the individual processing elements are gathered in a status table 130. This means that the central controller knows at all times the completion state of the tasks performed by the individual processing elements and can transmit instructions accordingly.

The central controller also comprises a memory 140 in which the programme to be executed by the processor is stored, said programme consisting of a sequence of tasks $task_0, task_1, \ldots, task_N$, each task being itself made up of a series of instructions. Advantageously, as will be discussed in more detail below, the instructions of the task or sequence of tasks are transmitted in a loop on the instruction bus. A computational flow is defined as an ordered subsequence of the tasks in the sequence of tasks $task_0, task_1, \ldots, task_N$. A computational flow can relate to a subset of the set of processing elements, or in some cases all the processing elements.

An instruction comprises a header followed by a computational flow identifier and, if applicable, the order index of the instruction in the task, and then a number of words defining the instruction to be performed and, if applicable, arguments of this instruction. Advantageously, the instruction can be coded in compressed form, for example as an instruction index pointing in an instruction library. In the case of a smart optical sensor, an example of such an instruction could be convolution with a kernel to filter pixels of the macropixel, the kernel being provided as an argument to the instruction. Alternatively, the instruction may be directly executable by the processing element without needing to be decoded. Both types of aforementioned instructions can generally coexist.

Figure 2:
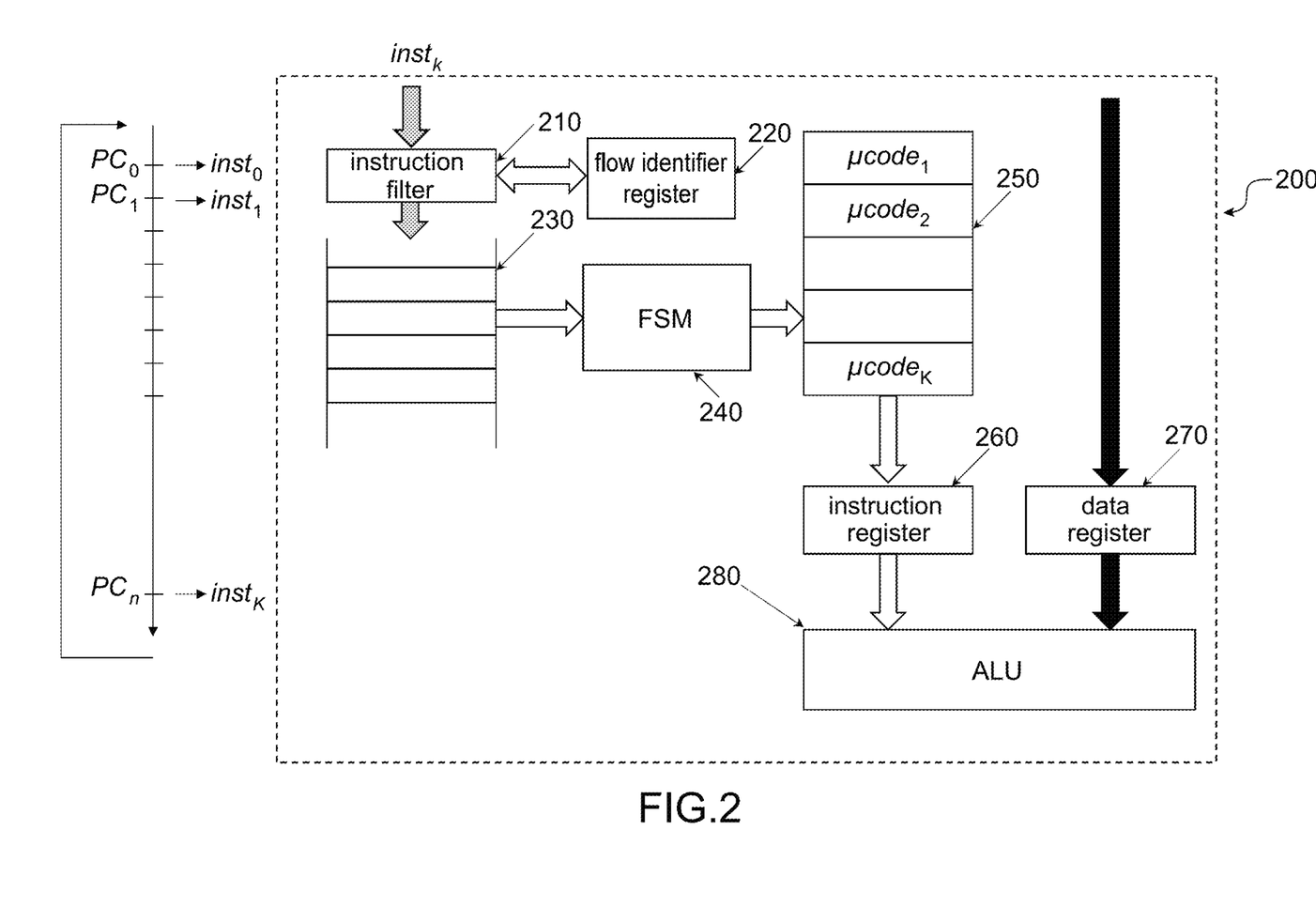
FIG. 2 schematically represents the architecture of a processing element of the processor of FIG. 1.

FIG. 2 schematically represents the architecture of a processing element of FIG. 1.

On the left of the figure, it has been reminded that the central processor was transmitting in a loop a sequence of instructions $inst_0, \ldots, inst_K$ on the instruction bus. These instructions can be relating to different tasks, a task belonging to a calculation flow that one or more processing element(s) has (have) to execute.

Each instruction is read on the bus by the processing element 200. The instruction header is analysed by a filter module 210. The filter module detects start of the instruction by means of the header, extracts the computational flow identifier and determines whether the computational flow relates to it or not. To do this, it compares the received identifier with the identifier stored in a current flow register 220. This register contains the identifier of the current flow to be executed by the processing element, in other words the tasks in this computational flow that this processing element has to perform. The contents of register 220 are loaded at the time of the initialisation phase of the processor or by a specific microcode.

Advantageously, the instruction can be encoded in compressed form, for example as an instruction index pointing to an instruction library.

When the instruction belongs to a computational flow relating to the processing element, the instruction pointer is stored in a FIFO buffer, 230. In the case where the FIFO buffer is full, the instruction in question is not recorded. However, the instruction pointer can be stored in the next iteration of the instruction loop if space has become available at the buffer input in the meantime.

Depending on the nature of the sequence of instructions making up a task, different alternative embodiments are possible.

According to a first alternative, the sequence can be resumed from any instruction, in particular because the individual instructions in the sequence can be executed independently. In this case, the processing element ensures that the FIFO buffer is empty enough to store a complete sequence, which can then be executed again. For example, the FIFO buffer can be purged when a sequence has been interrupted or an overflow has occurred.

According to a second alternative, all instructions in a task have to be performed in the order in which they appear in the sequence. In this case, it should be ensured that all instructions in this task are performed in that order by the processing element, even in the case of FIFO buffer overflow. In this case, each instruction includes an additional field indicating the sequence number of the instruction in the task. In addition, the 210 filter module includes a counter that is incremented each time an instruction is stored in the FIFO buffer and is reset to zero at the end of the task. This value is used to filter the instructions and ensure that they are safely entered sequentially into the FIFO. Thus, only the next instruction in the task, whose sequence number is equal to the output of the counter and whose flow identifier corresponds to that stored in register 220, can be stored in the FIFO buffer.

In general, the instruction transmission frequency by the central controller is substantially higher than the instruction processing frequency by the processing elements, allowing different instruction flows to be transmitted to different processing elements without forcing them to wait for an instruction.

One advantageous solution is to interleave instructions of the different computational flows, allowing a regular supply of instructions for the different flows.

If a sequence of instructions that make up a task is performed faster than others, it can be advantageously repeated several times in a repetitive task cycle. The man skilled in the art will be able to define an order of the instructions of the different tasks and the number of repetitions of these tasks for an optimal operation of the processing element, namely to avoid too many times where the FIFO buffer is empty (thus the processing element is waiting for instructions) or saturated.

When an instruction is taken into account for execution by the processing element, the instruction pointer is unstacked from the FIFO buffer and supplied to the FSM (Finite State Machine) 240. It acts as a microsequencer: it extracts and sequences the microcode pointed to by the instruction pointer into the microcode library 250. This microcode library is loaded during initialisation (or during a specific phase of system operation-reconfiguration—by the central controller 110). The microinstructions contained in the microcode are transferred sequentially one by one into microinstruction register 260. The Arithmetic and Logic Unit (ALU) 280 receives these microinstructions sequenced by the state machine 240, arguments, as well as data to which the instruction relates. The data will have previously been read from the memory cell associated with the processing element and stored in data register 270.

It will thus be understood that the programme to be executed by the processor may include different tasks to be executed in parallel by the different processing elements, thus emulating a MIMD architecture.

For example, in the case of a smart optical sensor, processing elements associated with macropixels in the centre of the image will be able to search for Points Of Interest (POI), while processing elements associated with macropixels at the periphery of the image will be able to detect motion. The instructions relating to these two tasks are transmitted at high frequency and in a loop (repeatedly) on the instruction bus, with the processing elements in the central zone selecting the instruction flow for the first task (POI search) and the processing elements in the peripheral zone selecting the instruction flow for the second task. Note that the instruction flow of the first task and the instruction flow of the second task need not be successive. For example, the instructions relating to the two tasks can be interleaved.

The mechanism of iteration of the instruction loop on the one hand and of filtering of instructions at the processing elements on the other hand allows processing operations carried out by the latter to be differentiated.

It will be noted that the different tasks are executed asynchronously by the different processing elements. This also makes it possible to have different processing frequencies for the processing elements and thus to optimise power consumption according to the tasks to be performed. In particular, two processing elements in charge of the same task can complete it at different times due to the respective occupancy states of their FIFO buffers. When a single processor has completed the execution of an instruction flow, it informs the central controller of it via the status bus.

The asynchronous nature of execution of tasks can be exploited to distribute computing load between the processing elements.

Alternatively, it is possible to synchronise the execution of tasks between neighbouring processing elements.

Figure 3:
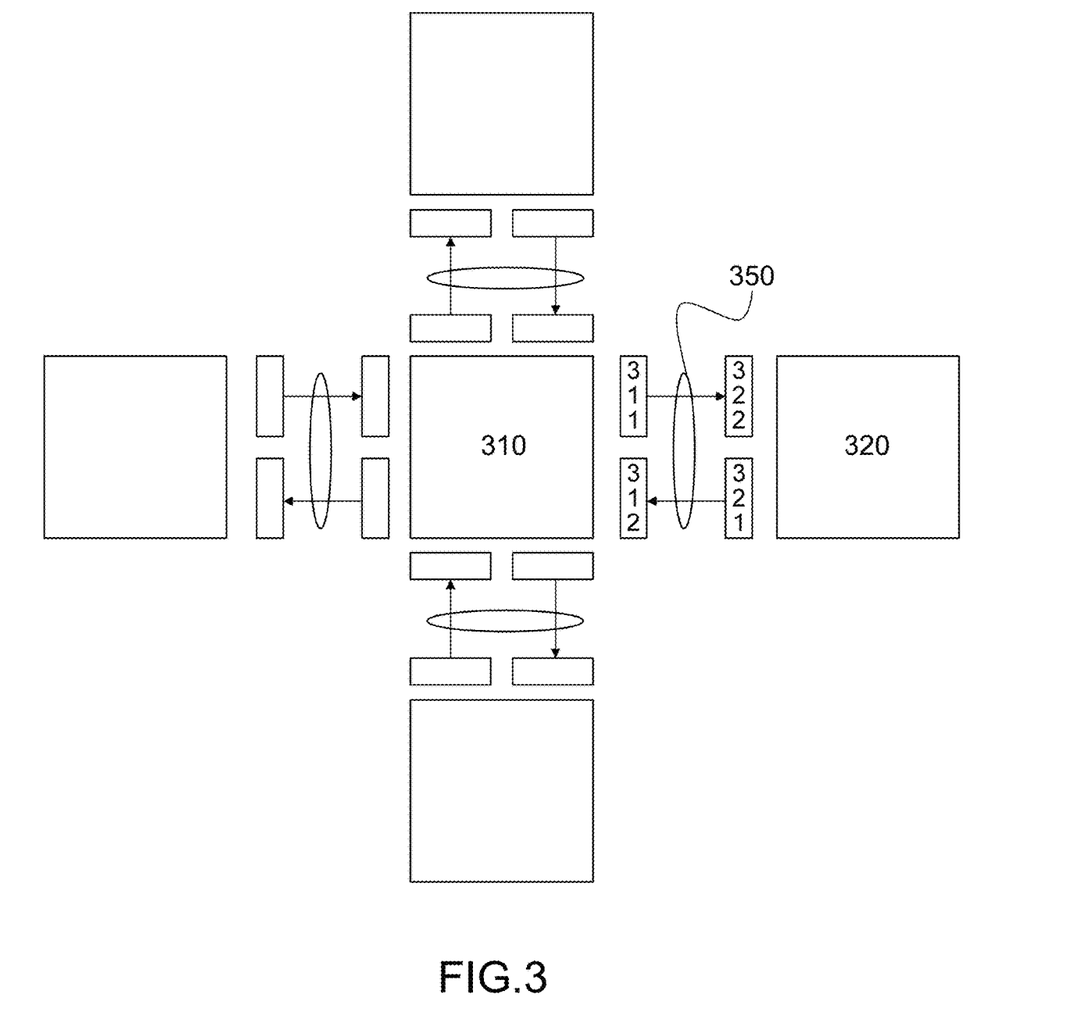
FIG. 3 schematically shows a synchronisation mode between two processing elements of the processor of FIG. 1.

FIG. 3 schematically represents a synchronisation mode between two neighbouring processing elements.

In this embodiment, neighbouring processors can exchange data via duplex communication links, with each communication link implementing two registers, namely a transmit register and a receive register.

Advantageously, four communication links are provided per processing element, connecting it to its four neighbours (in the North, South, East, West directions). Alternatively, eight communication links can be provided, connecting it to its eight neighbours (neighbours in the previous sense and those along diagonal directions). The association of a transmit register and a receive register per link allows asynchronous communication between neighbouring processing elements.

In FIG. 3 a first processing element 310 and a second processing element 320, neighbour to the first one, are represented. The duplex communication link 350 connects, on the one hand, a first transmit register 311 of the first processing element to a second receive register 322 of the second processing element and, on the other hand, a second transmit register 321 of the second processing element to a first receive register 312 of the first processing element.

A microcode send in the processing element allows data to be transmitted to a neighbouring processing element via a communication link. Similarly, a microcode receive is to receive data from a neighbouring processing element via the same link. However, it is necessary to ensure that the codes of the transmitting and receiving processing elements are safely written in such a way that the data transfer is carried out properly (one microcode send on one side corresponding to one microcode send on the other side, and vice versa) and in the order provided.

Different alternatives of the microcodes send and receive are contemplatable depending on whether transfers in the communication registers block the sequence of micro-instructions in the processing element or not.

By way of example, the semaphore principle can be used to take into account data transmission or reception. To do this, each communication register includes a status bit that indicates whether the register in question is empty or full.

Execution of the microcode send transfers data from the ALU to a transmit register of the processing element to be transmitted on the corresponding communication link. Two situations are possible: either the microcode send is blocking, in which case it stops execution of the microinstruction sequence until the transmit register is empty, or it is non-blocking, in which case the microcode simply writes the data to the transmit register and sets the register status bit to "full" without the execution of the microinstruction sequence being affected therefrom.

Reciprocally, on the side of the processing element receiving the data, the latter executes the microcode receive which in turn may be blocking or non-blocking. If it is blocking, the receiving processing element waits for the status bit in the transmit register of the transmitting processing element to be set to "full" value. When this condition is met, the data in the transmit register of the transmit processing element is stored in the receive register of the receiving processing element. The microcode receive will then set the transmit register status bit (of the transmitting processing element) to "empty" value and the receive register status bit (of the receiving processing element) to "full" value. A further microcode read can then read the data from the receive register and provide it as an input to the ALU (of the receiving processing element). After reading the receive register, the microcode read sets register status bit to "empty" value.

The man skilled in the art may contemplate different combinations of the (blocking or non-blocking) instructions send, receive and read, without departing from the scope of the present invention.

Synchronisation between processing elements for transmitting and receiving data can also be achieved via the central controller, which then explicitly schedules data exchange in synchronous mode.

Figure 4:
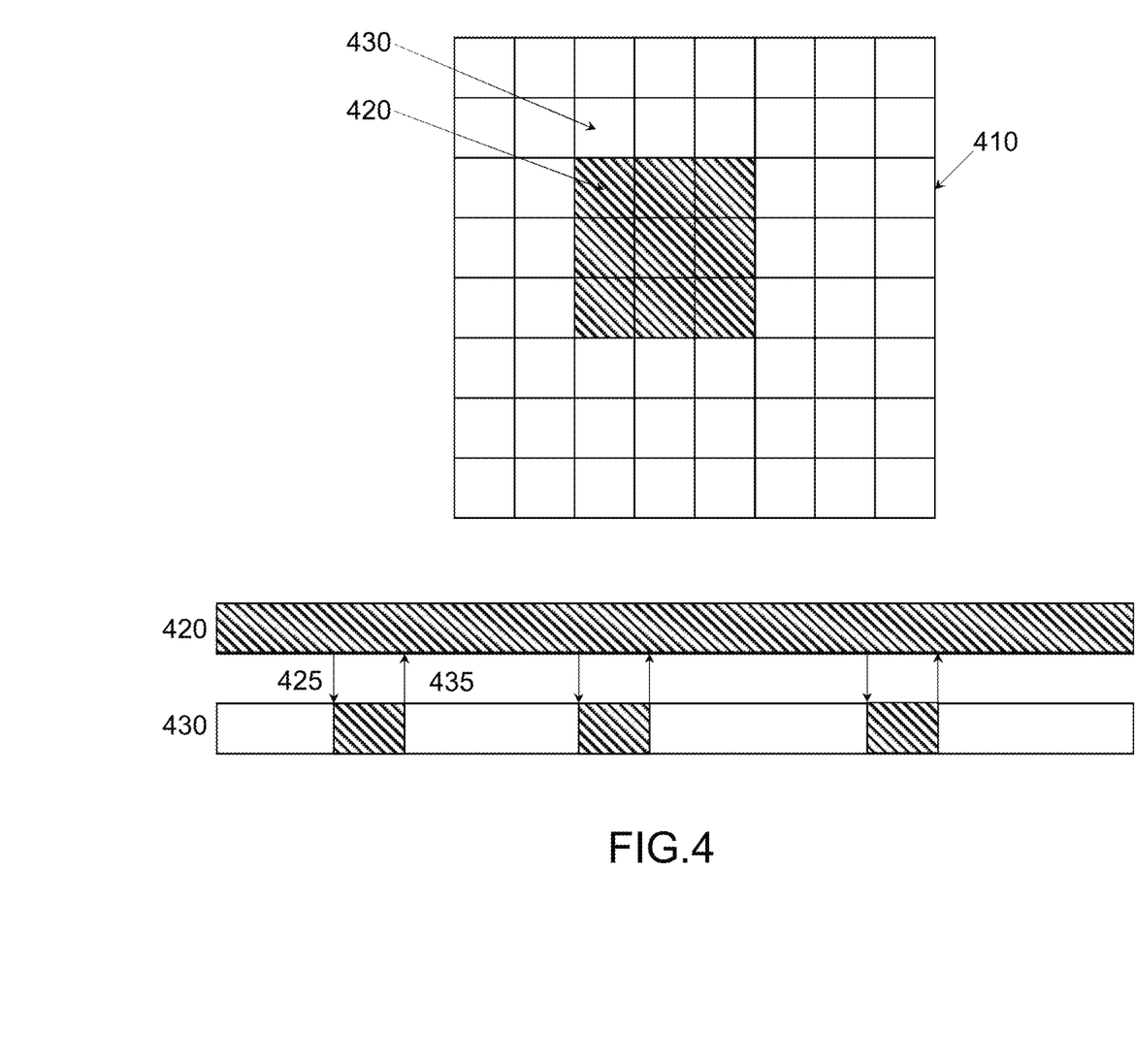
FIG. 4 schematically represents a delegation of tasks between two processing elements of the processor of FIG. 1.

FIG. 4 shows a delegation of tasks between two processing elements under the supervision of the central controller.

When a processing element 430 has completed its task and notified it to the central controller on the status bus, it becomes available for further processing. A neighbouring processing element 420 can then delegate part of its currently executing task to it. Processing element 420 is notified of the availability of processing element 430 by the central controller, which updates the status table. The central controller can then indicate the task to be performed to it via a new code to be loaded into register 220 and trigger in 425 data transfer via the communication link connecting them.

This indication can also take the form of a start address and an end address in the computational flow. Processing element 430 then uses its selection module to determine which instructions are intended for processing element 420 and whose addresses are included between the start and end addresses of the delegated task. At the end of the execution of the delegated task, processing element 430 informs the central controller, which updates its status table. The processing element 420 is thus informed of the end of the delegated task in 435 and triggers data transfer to receive it in its reception register (or buffer). In the case of an optical sensor, the delegation of tasks can, for example, relate to part of the macropixel data and/or a particular operation. For example, if point of interest search and motion detection are to be performed by the processing elements in a zone of the image (hatched zone) and only motion detection is to be performed in the rest of the image, processing element 430 may be in charge of point of interest search on behalf of processing element 420 once it has completed its motion detection task. The delegation of tasks method can be repeated over time until the program is complete.

The invention claimed is:

1. A processor with SIMD architecture comprising a matrix of processing elements, each processing element being associated with a memory cell for storing data to be processed by said processing element, the processor further comprising a central controller, the processing elements being connected to the central controller by a first bus, called an instruction bus, enabling the central controller to transmit instructions in parallel to the processing elements, and by a second bus, called a status bus, enabling the central controller to receive statuses of the various processing elements, wherein:

the central controller comprises a memory wherein the tasks to be performed by the various processing elements are stored in the form of a sequence of instructions, the central controller transmitting the sequence of instructions in a loop on the instruction bus, each instruction comprising a computational flow identifier, a computational flow being defined as an ordered list of tasks, each computational flow relating to one or more processing element(s);

each processing element comprises an instruction filter and an identifier table, the instruction filter being adapted to extract the computational flow identifier from each instruction received by the processing element and to determine whether the identifier is present in said table, the instruction being stored in a FIFO buffer to be executed by the processing element if yes, and rejected by the processing element if no.

2. The processor with SIMD architecture according to claim 1, wherein the FIFO buffer is unstacked at each instruction executed by said processing element.

3. The processor with SIMD architecture according to claim 2, wherein each instruction of a task has an order number indicating its order of execution in the task, the instruction filter of the processing element comprising a counter which is incremented each time the FIFO buffer is unstacked, an instruction being stored in the FIFO buffer only if its flow identifier is present in the table of the processing element and if its order number is equal to the output value of said counter.

4. The processor with SIMD architecture according to claim 1, wherein the instruction transmission frequency on the instruction bus is substantially higher than the execution frequency of these instructions by the processing elements.

5. The processor with SIMD architecture according to claim 1, wherein each instruction comprises an instruction pointer and that the processing element comprises a microsequencer connected to a storage memory of a microcode library, the microsequencer sequencing the microinstructions of the microcode pointed to by said instruction pointer.

6. The processor with SIMD architecture according to claim 5, wherein each processing element is connected to its neighbours with communication links, a communication link between a first processing element and a second processing element connecting a first transmit register of the first processing element to a second receive register of the second processing element and a second transmit register of the second processing element to a receive register of the first processing element.

7. The processor with SIMD architecture according to claim 6, wherein executing micro-instructions by the first processing element is stopped as long as the first transmit register is not empty.

8. The processor with SIMD architecture according to claim 6, wherein executing micro-instructions by the second processing element is stopped as long as the second receive register is not full.

9. The processor with SIMD architecture according to claim 6, wherein the first processing element having completed the execution of a task informs the central controller of it by notification of its status and the second processing element is informed of this status by the central controller.

10. A smart optical sensor comprising a matrix of elementary sensors and a processor with SIMD architecture according to claim 1, each processing element being associated with a plurality of sensors of said matrix and being adapted to process signals coming from these sensors.

11. The smart optical sensor according to claim 10, wherein each processing element itself has a SIMD architecture.

\* \* \* \* \*